United States Patent
Sack et al.

[11] Patent Number: 6,143,808
[45] Date of Patent: Nov. 7, 2000

[54] POLYMER COMPOSITIONS IN POWDER FORM

[75] Inventors: Heinrich Sack, Hassloch; Helmut Teichmann; Eckehardt Wistuba, both of Bad Dürkheim; Maximilian Angel, Schifferstadt; Wilhelm Friedrich Beckerle, Bobenheim-Roxheim; Rüdiger Füssl, Neustadt; Jeffrey Knight, Mannheim; Richard Krämer, Ludwigshafen; Joachim Roser, Mannheim, all of Germany

[73] Assignee: BASF Aktiengesellschaft, Ludwigshafen, Germany

[21] Appl. No.: 08/963,762

[22] Filed: Nov. 4, 1997

[30] Foreign Application Priority Data

Nov. 6, 1996 [DE] Germany .......................... 196 45 732

[51] Int. Cl.⁷ .................................................. C08K 9/00
[52] U.S. Cl. ......................... 523/205; 428/407; 523/206
[58] Field of Search ............................. 428/407; 523/205, 523/206, 216, 217

[56] References Cited

U.S. PATENT DOCUMENTS

| | | |
|---|---|---|
| 3,784,648 | 1/1974 | Bergumeister et al. |
| 3,829,402 | 8/1974 | Wolfgang . |
| 3,855,167 | 12/1974 | Bowman .................... 523/209 |
| 4,532,271 | 7/1985 | Kai ............................ 523/216 |
| 4,800,103 | 1/1989 | Jeffs .......................... 523/206 |
| 4,879,321 | 11/1989 | Laroche ..................... 523/217 |
| 4,908,396 | 3/1990 | Evans ........................ 523/206 |
| 5,162,187 | 11/1992 | Lyons ........................ 523/206 |
| 5,219,901 | 6/1993 | Burke ........................ 523/205 |
| 5,543,174 | 8/1996 | Rutz .......................... 428/407 |
| 5,621,023 | 4/1997 | Nishimura ................. 523/206 |
| 5,633,295 | 5/1997 | Higgs ........................ 523/206 |
| 5,696,183 | 12/1997 | Sarraf ....................... 523/216 |
| 5,814,686 | 9/1998 | Micale ...................... 523/205 |

FOREIGN PATENT DOCUMENTS

| | | |
|---|---|---|
| 2 167 732 | 8/1973 | France . |
| 20 49 114 | 4/1972 | Germany . |
| 612121 | 11/1948 | United Kingdom . |
| 866038 | 4/1961 | United Kingdom . |
| 2 241 499 | 4/1991 | United Kingdom . |

OTHER PUBLICATIONS

Derwent Abstracts, EP 0 675 089, Oct. 4, 1995.
Derwent Abstracts, FR 25 88 008, Apr. 3, 1987.
Derwent Abstracts, DE 3 143 071, May 11, 1983.
Derwent Abstracts, DE 1 962 3412, (corr. EP 812 872, Dec. 17, 1997).
Derwent Abstracts, WO 95 25702, (corr. FR 2 717 416, Sep. 22, 1995).

*Primary Examiner*—Paul R. Michl
*Attorney, Agent, or Firm*—Oblon, Spivak, McClelland, Maier & Neustadt, P.C.

[57] ABSTRACT

The invention relates to a pulverulent polymer composition comprising a) a particulate mineral carrier of high specific surface area and b) a polymer dispersion applied to the carrier, and to a process for preparing this pulverulent polymer composition, to its use for preparing building materials, and to polymer-modified building materials, such as bitumen, dry mortars, powder adhesives, pulverulent coating formulations and filling compounds, all of which comprise such polymer compositions.

21 Claims, No Drawings

POLYMER COMPOSITIONS IN POWDER FORM

The invention relates to pulverulent polymer compositions, to processes for their preparation and to building materials which comprise these polymer compositions.

Polymer additives for building materials such as bitumen, mortars, filling compounds, adhesives and coating formulations are known and in widespread use. Polymers or polymer mixtures can be added to these products in, for example, solid form or in liquid, usually aqueous form.

Aqueous dispersions of acrylate-styrene copolymers are used, for example, for producing structural adhesives, tile adhesives, paints and impregnating materials. Where high viscosity and a high solids content are required, as in the case of structural adhesives, for example, a polymer dispersion is incorporated using high-speed forced mixers into the mass of adhesive already introduced. Paints are generally prepared in high-speed stirrers, such as dissolvers, by first of all dispersing the filler/pigment mixture, mixing it with pasting aids and only then adding the dispersion to this mixture.

Aqueous dispersions of butadiene-styrene copolymers are used to improve the mechanical properties of asphalt and the weathering stability of coatings based on anionic and nonionic bitumen emulsions or bitumen adhesives and filling compounds, giving them greater thermal stability and improved low-temperature flexibility. In general, the polymer dispersion is either introduced into the aqueous initial charge during the actual preparation of the bitumen emulsion or is mixed into the bitumen emulsion while the latter is preferably still hot from production.

The use of aqueous polymer dispersions, however, is associated with substantial disadvantages. For example, storage of the aqueous dispersions is not unproblematic since they must not come into contact with metals sensitive to corrosion, such as iron, copper, zinc and aluminum or alloys of these metals. Moreover, they are sensitive to strong heating and to the effect of frost. Furthermore, it is necessary to protect the dispersions against infestation by microorganisms, necessitating the addition of preservatives and, in some circumstances, necessitating laborious measures for tank hygiene. As a result the dispersions can only be stored for about 6 to 12 months at about 10 to 30° C. in tightly sealed containers.

The use of aqueous dispersions for modifying bitumen or asphalt in the hot state is a particular problem, since owing to the spontaneous development of steam to which this gives rise the dispersion can only be incorporated very slowly. Furthermore, there is a risk of accident as a result of splashing and delayed boiling.

For these reasons it is often sensible to incorporate polymers or polymer mixtures in solid form, generally as powders, into the products which are to be modified.

It is known to prepare polymer powders by spraying aqueous polymer dispersions in a stream of hot air. In the case of polymers having glass transition temperatures ($T_g$) below about 50° C. it is additionally necessary to add spraying assistants in order to prevent the polymer particles sticking together in the dryer. Spraying assistants which can be added include, in addition to water-insoluble inert additives such as highly disperse silicic acid, also aqueous copolymer solutions based on vinylpyrrolidone and vinyl acetate (DE-A-3143071) and also water-soluble, sulfonate-containing condensation products of melamine and formaldehyde (DE-A-2049114).

However, the use of spraying assistants is associated with disadvantages. Thus there is the problem, for example, that the polymeric spraying assistants in many cases have quite different $T_g$ values, and thus different physico-chemical properties, from the polymer that is to be spray-dried. When the spray-dried polymers are incorporated into the end products, therefore, there is a problem with establishing their properties precisely. Furthermore, it is known that spraying assistants usually also exert a certain surface-active effect which in turn has an adverse effect, for example, on the wetting of the particles in the mineral building material or auxiliary building material by the water used to make the latter up and thus on the flow properties of the polymer-modified substance in the ready-to-use form after it has been made up (DE-A-19623412).

These disadvantages, plus the high energy demand of spray drying, are taken into account in order to obtain the polymers in the form of free-flowing, tack-free powders.

It is an object of the present invention, therefore, to provide a polymer composition which avoids the abovementioned disadvantages. The intention is in particular to provide a polymer composition which is suitable for long storage and transportation times and is substantially insensitive to frost and to high temperatures, requires no added preservatives and can be incorporated more rapidly and with less danger than conventional aqueous dispersions into a hot initial charge. Furthermore, it should be possible to prepare such a composition with low energy consumption, and it should not adversely affect the properties of products which are modified using it.

We have found that this object is achieved by the provision of a pulverulent polymer composition comprising a) a particulate mineral carrier of high specific surface area and b) a preferably aqueous polymer dispersion applied to the carrier.

It has surprisingly now been found that by incorporating the polymer dispersion into the particulate mineral carrier having a high specific surface area tack-free, free-flowing powders which are easy to process are obtained.

The novel pulverulent polymer compositions possess further surprising advantages. They are easy to prepare without great technical expense, are simple and inexpensive to package and are particularly suitable for long transportation and storage times, since no preservatives are required and there is no frost risk. Moreover, they can be readily and rapidly incorporated into hot initial charges, for example into hot bitumen melts, without danger to personnel as a result of splashing or delayed boiling. Incorporation into other building materials, such as dry mortars, powder adhesives, pulverulent coating preparations and filling compounds, also proceeds without a hitch.

There is no particular restriction on the polymers which can be used to prepare the novel polymer composition. The critical factors are that they lend themselves well to application to the carrier that is used in accordance with the invention and that, in this carrier-bound form after incorporation with the end product, they still possess the desired modifying effect on the properties of the product.

Examples of polymers which are suitable in accordance with the invention are polymers based on acrylic acid, methacrylic acid, acrylates and methacrylates, vinyl esters, vinyl chloride, vinyl ethers, butadiene, isoprene, chloroprene, itaconic acid, maleic acid, fumaric acid, maleic anhydride and, in particular, acrylate-styrene copolymers, acrylate-styrene-acrylic acid terpolymers, butadiene-styrene copolymers, butadiene-styrene-acrylic acid terpolymers and vinyl propionate-vinyl chloride copolymers. Preference is given to polymers or polymer mixtures whose glass transition temperature is from about −80 to +60° C., in particular from about −60 to +50° C.

Data relating to monomer composition and glass transition temperature of individual preferred polymers, and on the fillers content and pH range of individual preferred aqueous dispersions of these polymers, are given in Table 1 below.

TABLE 1

| Dispersion | pH range | Solids content (% by weight) | Monomers[1] (% by weight) | Glass transition temperature (° C.) |
|---|---|---|---|---|
| D1 | 7.5–9.0 | 50 ± 1 | 50 BA<br>46 S<br>4 AS | 15 |
| D2 | 7.0–8.5 | 57 ± 1 | 60 BA<br>40 S | −8 |
| D3 | 6.0–7.0 | 50 ± 1 | 31 BU<br>64 S<br>5 AS | 25 |
| D4 | 10.0–11.0 | 66 ± 1 | 68 BU<br>32 S | −50 |
| D5 | 10.0–11.0 | 67 ± 1 | 68 BU<br>32 S | −50 |
| D6 | 4.0–6.0 | 50 ± 1 | 53 VP<br>47 VC | 28 |

[1]AS = Acrylic acid, BA = Butyl acrylate, BU = Butadiene, S = Styrene, VC = Vinyl chloride, VP = Vinyl propionate The particulate mineral carriers used in accordance with the invention should preferably have a mean particle diameter of from about 0.01 to 150 μm, for example from 0.01 to 5 μm or 5 to 100 μm, a specific surface area, determined for example by nitrogen adsorption (in accordance with DIN 66131), of from about 0.5 to 120 m$^2$/g and/or an oil number of from about 10 to 30 g of oil per 100 g.

As mineral carriers into which the aqueous dispersions of abovementioned polymers can be incorporated, particular mention may be made, by way of example, of chalk, calcite, dolomite, quartz flour, titanium dioxide, aluminum silicate, talc, mica, kieselguhr, gypsum, magnesite, slate flour, barium sulfate and mixtures thereof. Among these mineral carriers preference is given to dolomite, aluminum silicate, chalk and mica.

In accordance with a preferred embodiment use is made of micronized dolomite, for example dolomite as marketed by Micro Minerals under the trade name Microdol cryptocrystalline champagne chalk with a rhombohedral particle morphology, known as Omya chalk, and wet-ground mica from Microfine Minerals. Very particularly preferred carriers are dolomites having mean particle diameters of from 1.5 to 3 μm, an oil number of from 12 to 21 and a specific surface area of from 2 to 5 m$^2$/g (such as the commercial products Microdol 1, Microdol Extra and Microdol Super), Omya chalks having a mean particle diameter of from 0.5 to 3 μm, and an oil number of from 15 to 23 and a specific surface area of from 1 to 11 m$^2$/g, and aluminum silicate having a mean particle size of from 0.01 to 0.05 μm and a specific surface area of from 100 to 120 m$^2$/g.

In accordance with a further preferred embodiment, the mineral carrier comprises one, more or all of the mineral components of a building material. If desired, these components can be present as a mixture with other nonmineral additives as are commonly used in such building materials. In addition, it is not necessary for all the mineral components of the mixture to meet the above criteria in respect of particle size and surface area.

According to another preferred embodiment, the mineral carrier is combined with a fiber component. The latter can comprise, in principle, organic or inorganic, natural or synthetic fibers. Particular preference is given, however, to cellulose fibers. It is preferred to use fibers having an average length of from about 100 to 1000 μm, preferably from about 500 to 800 μm, and an average thickness of from about 10 to 30 μm, preferably from about 15 to 25 μm. The fiber content can vary greatly depending on the intended use but is commonly in the range, for instance, from about 0.1 to 20% by weight, based on the overall weight of the mineral carrier.

The invention also provides a process for preparing the novel pulverulent polymer compositions, which comprises incorporating a preferably aqueous dispersion of the polymer into a particulate mineral carrier as defined above.

For example, the polymer dispersions are added dropwise or by spraying, with vigorous stirring and in each case in small amounts, to an initial charge of a carrier, for example, dolomite, which may have been preheated. For large-scale industrial preparation it is possible to use the customary mixing apparatus, known, for example, from Ullmann, Encyclopädie der technischen Chemie, 3rd ed., 1951, Volume 1, p. 713 ff., such as barrel mixers, cone mixers, plowshare mixers, but preferably dissolvers, drum mixers or turbulence mixers. Pulverulent polymer compositions can be prepared having a polymer content of from 2 to 20% by weight, based on the overall weight of the composition. Subsequent drying is generally unnecessary. Even without drying, the compositions are surprisingly obtained as readily free-flowing, tack-free powders. The polymer content can be increased in accordance with requirements by intermediate drying at low temperatures, to prevent melting of the polymers on the mineral carrier, and further mixing in of polymer dispersion, to levels of up to about 60% by weight, based on the mixture.

The polymer dispersions used in accordance with the invention generally have solids contents of from 15 to 75% by weight, preferably from 40 to 70% by weight. They are preferably prepared by emulsion polymerization. In emulsion polymerization, polymerizable olefinically unsaturated monomers are emulsified in water with the aid of surface-active compounds and are polymerized using water-soluble initiators. Techniques of emulsion polymerization are known, for example, from Ullmann, Encyclopädie der technischen Chemie, 3rd ed., 1963, Volume 14, p. 127 ff.

The invention also provides building materials which have been produced using at least one pulverulent polymer composition of the present invention. Novel, polymer-modified building materials are selected in particular from bitumen products, such as asphalt, bituminous adhesives, sealing, filling and coating compounds and insulating materials, and nonbituminous, cement-containing or cement-free products, such as plaster, mortar, screed, concrete, adhesives, sealing, filling and coating compounds, and primers. The polymer-modified building materials are normally prepared by incorporating the pulverulent polymer composition into a cold or heated building material base which is in powder or paste form. The building material base is, for example, a bitumen melt or a mixture of minerals and additives as are used in pulverulent building materials, for example dry mortars and the like. Examples of customary additives to building materials are defoamers, retardants, thickeners, water retention agents, pigment dispersants and the like. The nature and amount of the polymer introduced vary depending on the intended use of the building material. Usually, the amount of polymer introduced is from about 0.5 to 30% by weight, based on the overall weight of the building material. The polymer content of powder adhesives is, for example, from about 3 to 20% by weight, that of dry mortars is below 10% by weight and that of aqueous coating materials is from about 5 to 15% by weight (corresponding to about 8 to 25% by weight based on a pulverulent formulation.).

The invention also provides those building materials, preferably in powder form, that are obtained by direct incorporation of an aqueous polymer dispersion as defined above into a mixture of pulverulent, mineral and, if used, nonmineral components of the building material.

An embodiment which is preferred in accordance with the invention relates to polymer-modified bitumen products which comprise bitumen in a customary form which is solid, semisolid or liquid, preferably solid, at room temperature and comprise a novel pulverulent polymer composition. Polymer-modified bitumen is suitable for use in insulating coatings, for example in the protection of buildings, in electrical insulating materials, in adhesives, impregnating compositions and coating compositions for the roofing felt industry and, preferably, in hot asphalts used in road building, for example in so-called sound-deadening asphalt.

Particular preference is given to polymer-modified bitumen which as polymer comprises a butadiene-styrene copolymer of 68% by weight butadiene and 32% of styrene, in an amount of from 1 to 10% by weight, based on the overall weight of the polymer-modified bitumen, and comprises as carrier micronized dolomite, Omya chalk, aluminum silicate or wet-ground mica with a mean particle diameter of from about 0.01 to 5 $\mu$m. In this case the carrier is present in a proportion of from about 10 to 40% by weight, based on the overall weight of the bitumen.

Another preferred bitumen product is obtained by incorporating a polymer composition comprising as carrier a mixture of particulate mineral carriers as defined above and a fiber component. Bitumen compositions of this kind possess a particularly advantageous thermal stability. Use is preferably made of cellulose fibers having an average length of from about 500 to 800 $\mu$m and an average thickness of from about 10 to 30 $\mu$m. The fiber content is from about 0.5 to 2% by weight based on bitumen, in particular about 1% by weight. In the case of the fiber-reinforced bitumen products, the use of butadiene-styrene copolymers as modifier is also of particular advantage.

The novel, polymer-modified bitumens are preferably prepared by incorporating the novel pulverulent polymer composition into a bitumen emulsion or into a bitumen melt.

Further preferred embodiments of the invention relate to powder adhesives, coating compositions, dry mortars and filling compounds comprising at least one novel pulverulent polymer composition. They are obtainable in conventional manner by incorporating the novel pulverulent polymer compositions, as described above, into the end product or incorporating the liquid polymer dispersions directly into the end product.

The invention also provides for the use of a novel pulverulent polymer composition for producing building materials as defined above.

The examples which follow illustrate the invention without limiting it to them:

EXAMPLE 1

Bitumen Modification by a Pulverulent Polymer Composition of Dolomite with Butadiene-Styrene Copolymer Deposited Thereon 400 kg of the dispersion D4 (Table 1) prepared by emulsion polymerization were incorporated in a dissolver into 1000 kg of an initial charge of dolomite having a mean particle size of 2.0 $\mu$m, a specific surface area of 3.9 m$^2$/g and an oil number of from 17 to 18 g/100 g (obtainable under the trade name Microdol® Extra from Micro Minerals). The mixing process was continued for 20 minutes at 2000 revolutions per minute. Surprisingly, this produced a tack-free, free-flowing powder.

25 kg of this pulverulent polymer composition were incorporated, with continual stirring in a 200 l stirred vessel, into 75 l of a melt at 180° C. of B80 standard bitumen according to DIN 1995, obtainable under the trade name Mexphalt® from Shell. After stirring for 30 minutes at 300 revolutions per minute the mixture was homogenous and suitable for further processing.

It was found advantageously that the incorporation of the pulverulent polymer composition was not only quicker and easier than that of the aqueous dispersion conventionally used but was also nonhazardous, since no splashing or delayed boiling occurred.

EXAMPLE 2

Determining the Properties of a Bitumen Composition Modified with a Novel Pulverulent Polymer Composition Eight hot bitumen mixtures were prepared, having the composition indicated in Table 2. Mixture 1 was a control and contained only unmodified B80 standard bitumen. Mixtures 4, 6 and 8 contain different amounts of Microdol 1 (micronized dolomite, mean particle diameter 2.65$\mu$). Mixtures 2, 3, 5 and 7 contained 5% of an added butadiene-styrene copolymer, based on the weight of the mixture. Mixture 2 was obtained by adding aqueous polymer dispersion (D5, Table 1) with a polymer content of 67%, based on the weight of dispersion, to B80 bitumen. Mixtures 3, 5 and 7 were obtained by incorporating novel polymer compositions having polymer contents of 16.7%, 23% and 28.6%, respectively, based in each case on the weight of the polymer composition.

Table 2 also shows the results of mechanical testing (in accordance with DIN 1995) of bitumen modified in accordance with the invention and of unmodified bitumen.

TABLE 2

| | Hot bitumen modified with D5 in dolomite | | | | | | | |
|---|---|---|---|---|---|---|---|---|
| Test | 1 | 2 | 3 | 4 | 5 | 6 | 7 | 8 |
| Bitumen B 80 | 100 | 95 | 95 | 95 | 95 | 95 | 95 | 95 |
| D5 67% | — | 7.5 | — | — | — | — | — | — |
| D5 16.7% in dolomite | — | — | 44.6 | — | — | — | — | — |
| D5 23% in dolomite | — | — | — | — | 32.5 | — | — | — |
| D5 28.6% in dolomite | — | — | — | — | — | — | 26 | — |
| Dolomite | — | — | — | 37.1 | — | 25 | — | 18.5 |
| Addition of polymer in % | — | 5 | 5 | — | 5 | — | 5 | — |
| Softening point: ° C. (ring and ball) | 46 | 55 | 65 | 51 | 61 | 50 | 56 | 50 |
| Penetration: 1/10 mm | 74 | 56 | 42 | 71 | 50 | 69 | 53 | 67 |
| Breaking point: ° C. | −12 | −19 | −17 | −18 | −16 | −18 | −13 | −15 |

Mixture 3 showed the highest softening point and the lowest penetration, while mixture 5 had a much lower softening point and higher penetration. The material properties of mixture 7 were only slightly better than those of the mixture 2 obtained by adding an aqueous dispersion. The incorporation of pure dolomite without addition of polymer likewise led to an improvement, albeit not so pronounced, in the mechanical properties (mixtures 4, 6 and 8).

Surprisingly, the bitumen compositions modified in accordance with the invention had a higher softening point than those modified with the aqueous dispersion, which constitutes a further advantageous effect of the present invention.

EXAMPLE 3

Polymer-Modified Fine-Grade Filling Compound 130 kg of quartz sand with a mean particle size of from 0.15 to 0.6 mm, 376 kg of quartz flour with a mean particle size of 5 μm, 18 kg of microsilica with a mean particle size of 1 μm, 417 kg of cement, 0.5 kg of cellulose ether and 10 kg of a commercial defoamer were charged to a mixer and 97 kg of the dispersion D1 (Table 1) prepared by emulsion polymerization were added. The components were mixed thoroughly at 2000 rpm for 25 minutes. Surprisingly, this gave a tack-free, free-flowing, pulverulent fine-grade filling compound.

EXAMPLE 4

Polymer-Modified Reinforcing Mortar for Composite Heat Insulation Systems 140 kg of quartz sand with a mean particle size of from 0.15 to 0.6 mm, 370 kg of chalk with a mean particle size of 1.3 μm, 18 kg of microsilica with a mean particle size of 1 μm, 430 kg of cement, 10 kg of a commercial defoamer and 2 g of cellulose ether were charged to a mixer. 60 kg of the dispersion D1 (Table 1) prepared by emulsion polymerization were added. The process of thorough mixing was continued at 2100 rpm for 20 minutes. Surprisingly, this gave a tack-free, free-flowing, pulverulent reinforcing mortar.

EXAMPLE 5

Elastic Grouting Compound 263 kg of the polymer dispersion D2 from Table 1 and 2 kg of a commercial defoamer were incorporated by stirring, in accordance with the instructions in Example 1, into 450 kg of an initial charge of aluminum silicate having a mean particle size of 0.03 μm, to give a tack-free, free-flowing powder.

After intermediate drying the powder thus obtained was transferred to a mixer where it was mixed with 107 kg of quartz sand (0.08 to 0.2 mm particle size), 143 kg of quartz sand (0.2 to 0.5 mm particle size) and 250 kg of Portland cement and 20 kg of commercial pulverulent defoamer at 2000 rpm for 20 minutes.

A tack-free, free-flowing dry component was obtained which is storable and which need only be made up with water prior to use to give an elastic grouting compound.

EXAMPLE 6

Powder Adhesive for Ceramic Tiles 765 kg of chalk with a mean particle size of 1.3 μm, 1 kg of sodium polyphosphate, 5 kg of bentonite, 3 kg of cellulose ether and 2 kg of a pulverulent salt of polyacrylic acid were charged to a mixer. 60 kg of the dispersion D1 (Table 1) prepared by emulsion polymerization were added. The process of thorough mixing was continued at 2100 rpm for 20 minutes. Surprisingly, this gave a tack-free, free-flowing powder adhesive.

We claim:
1. A pulverulent polymer composition comprising
    a) a particulate mineral carrier of high specific surface area and
    b) an aqueous polymer dispersion applied to the carrier, wherein said composition is a tack-free free-flowing powder prepared by admixing the particulate mineral carrier with the aqueous polymer dispersion, wherein the aqueous polymer dispersion has a solids content of from about 15 to 75% by weight, and the resulting pulverulent polymer composition has a polymer content of from 2 to 60% by weight and water contained within said pulverulent polymer composition from the aqueous polymer dispersion.
2. A polymer composition as claimed in claim 1, wherein the mineral carrier has a specific surface area of from about 0.5 to 120 m$^2$/g.
3. A polymer composition as claimed in claim 1, wherein the mineral carrier has an oil number from about 10 to 30 g of oil/100 g.
4. A polymer composition as claimed in claim 1, wherein the mineral carrier has a mean particle diameter of from about 0.01 to 150 μm.
5. A polymer composition as claimed in claim 1, wherein the mineral carrier is selected from chalk, calcite, dolomite, quartz flour, titanium dioxide, aluminum silicate, talc, mica, kieselguhr, gypsum, magnesite, slate flour, filter ash, microsilica and barium sulfate, or mixtures thereof.
6. A polymer composition as claimed in claim 5, wherein the mineral carrier comprises dolomite, aluminum silicate and/or mica.
7. A polymer composition as claimed in claim 1, wherein the mineral carrier additionally comprises a fiber component.
8. A polymer composition as claimed in claim 1, wherein the glass transition temperature of the polymer which is applied as aqueous dispersion to the mineral carrier is from about −80 to +60° C.
9. A polymer composition as claimed in claim 1, wherein the polymer is selected from polymers based on acrylic acid, methacrylic acid, acrylates, methacrylates, vinyl esters, vinyl chloride, vinyl ethers, butadiene, isoprene, chloroprene, itaconic acid, maleic acid, fumaric acid, maleic anhydride and mixtures thereof.
10. A process as claimed in claim 1, wherein the polymer dispersion is incorporated in at least one step with or without intermediate drying beforehand.
11. A polymer-modified building material comprising, in a pulverulent base that is in paste or solid form, at least one polymer composition as claimed in claim 1.
12. A polymer-modified building material as claimed in claim 11, wherein said pulverulent base is selected from the group consisting of asphalt, bituminous adhesives, sealing, filling and coating compounds and insulating materials, plaster, mortar, screed, concrete, adhesives, sealing, filling and coating compounds, and primers.
13. A polymer-modified building material as claimed in claim 11, which comprises the pulverulent polymer composition in an amount sufficient to incorporate polymer in a proportion of about 0.5 to 30% by weight, based on the overall weight of the building material, into said material.
14. A polymer-modified bitumen product as claimed in claim 12, whose polymer content is from about 1 to 10%, based on the overall weight of the polymer-modified product.

15. A polymer-modified bitumen product as claimed in claim 12, wherein the polymer composition comprises a butadiene-styrene copolymer.

16. A polymer-modified bitumen product as claimed in claim 12, which additionally comprises a fiber component in a proportion of from about 0.5 to 2% by weight, based on the overall weight of the bitumen present.

17. A process for preparing a polymer-modified bitumen product as claimed in claim 12, which comprises incorporating the pulverulent polymer composition into a bitumen emulsion or into a bitumen melt.

18. A process for preparing polymer-modified pulverulent nonbituminous building materials as claimed in claim 11, which comprises initially charging a mixture comprising at least one mineral component of the building material or auxiliary building material and incorporating the polymer dispersion.

19. A polymer composition as claimed in claim 1, wherein the mineral carrier comprises at least one mineral component of a building material, and, optionally further comprises a non-mineral additive.

20. A polymer-modified building material as claimed in claim 11, wherein said pulverulent base is selected from the group consisting of bitumen products, non-bituminous cement-containing products, and non-bituminous cement-free products.

21. A polymer composition as claimed in claim 9, wherein the polymer is selected from butadiene-styrene copolymers, butadiene-styrene-acrylic acid terpolymers, acrylate-styrene copolymers, acrylate-styrene-acrylic acid terpolymers, vinyl propionate-vinyl chloride copolymers and mixtures thereof.

* * * * *